United States Patent [19]

Beastrom et al.

[11] 4,019,065
[45] Apr. 19, 1977

[54] MULTIPLEXING DOCUMENT CARD READER WITH CONVEX LENS

[75] Inventors: Ralph Emil Beastrom; Arlen John Bowen; Ronald James Keller, all of Rochester; David George Nutt, Dodge Center, all of Minn.

[73] Assignee: International Business Machines Corporation, Armonk, N.Y.

[22] Filed: Dec. 24, 1975

[21] Appl. No.: 644,240

[52] U.S. Cl. ............................... 250/553; 250/569; 250/578
[51] Int. Cl.$^2$ ................... H05B 33/00; G06K 7/10; H01J 39/12
[58] Field of Search ............. 235/61.11 E; 250/569, 250/570, 553, 208, 578

[56] References Cited

UNITED STATES PATENTS

| | | | |
|---|---|---|---|
| 3,786,236 | 1/1974 | Sato et al. | 250/569 |
| 3,938,662 | 2/1976 | Ernst, Jr. et al. | 250/569 |

OTHER PUBLICATIONS

Seibel, "Reading Small, Tightly Spaced Bit Patterns", IBM Technical Bulletin, vol. 4, No. 10, Mar., 1962, p. 83.
Graham, Jr., "Columnator for Card Reader", IBM Technical Bulletin, vol. 9, No. 11, Apr. 1967, p. 1583.
Schwartz, "Photo-Logic Device", IBM Technical Bulletin, vol. 7, No. 1, June, 1964, p. 52.

Primary Examiner—Alfred E. Smith
Assistant Examiner—David K. Moore
Attorney, Agent, or Firm—Keith T. Bleuer

[57] ABSTRACT

A document card reader including a row of light sources transmitting light through a corresponding series of column-like cavities within a pair of members between which a document card with punched openings therethrough may move and a convex lens placed so as to receive light transmitted through the document card openings and transmit the light from all of the openings to a photodetector positioned at substantially the focal point of the lens.

6 Claims, 3 Drawing Figures

MULTIPLEXING DOCUMENT CARD READER WITH CONVEX LENS

BACKGROUND OF THE INVENTION

The invention relates to readers for reading the openings in punched document cards and more particularly to such readers utilizing radiant energy for their operation.

Conventional optical readers for document cards have generally used one light source and one light detector for each sensed position (for each row of openings in a longitudinally moveable document card) or have used fiber-optic light pipes with a single light source or with a single detector. It has also been proposed in an IBM Technical Disclosure Bulletin (Volume 17, No. 12, May, 1975, page 3684) that a plurality of light sources may be used for detecting the punched openings in a document card, using a smaller plurality of light detectors. This is accomplished using a plurality of transparent plastic blocks which have surfaces cut at 45 degrees with respect to the original directions of light transmission into the blocks so that the light is reflected in such manner as to be transmitted through a row of punched openings in a document card and is finally gathered to impinge on the smaller number of light detectors. Both the light sources and light detectors are multiplexed in order to detect individual punched openings in the document card.

SUMMARY OF THE INVENTION

It is an object of the present invention to provide an improved optical reader for a series of rows of punched openings in a document card using a single photodetector and a corresponding plurality of light sources and with a lens being provided so that the light rays transmitted through the openings in the document card all reach the single photodetector. It is also an object of the invention to provide means in such a reader for blocking the light from adjacent light sources and also for blocking ambient light rays with respect to the light path from a light source in direct registry with an opening in the document card to be read for providing reliability of read results.

In a preferred form, the optical reader of the invention includes a plurality of light sources, column-like cavities for transmitting the light from each of the light sources, a document card transporting slot extending transversely with respect to the cavities and located between light input and output ones of the cavities, a convex lens for gathering the light from the cavities, and a photodetector so positioned that the light gathered by the lens from the plurality of light sources impinges on the photodetector.

DESCRIPTION OF THE PREFERRED EMBODIMENT

Figure 1:
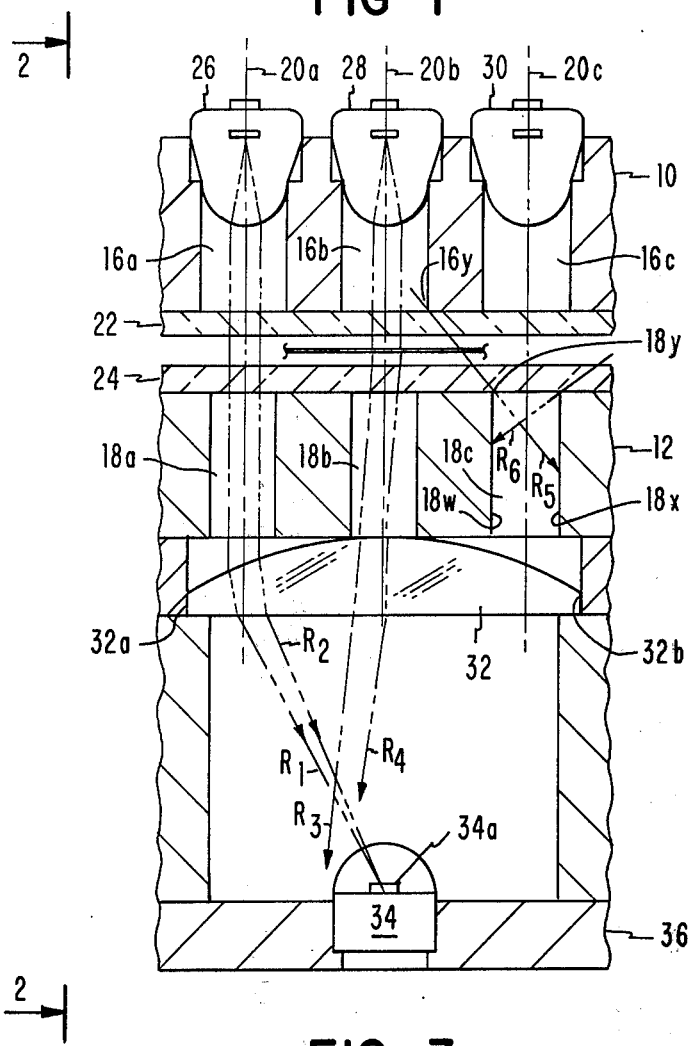
FIG. 1 is a cross sectional view of the document card reader of the invention.
Figure 2:
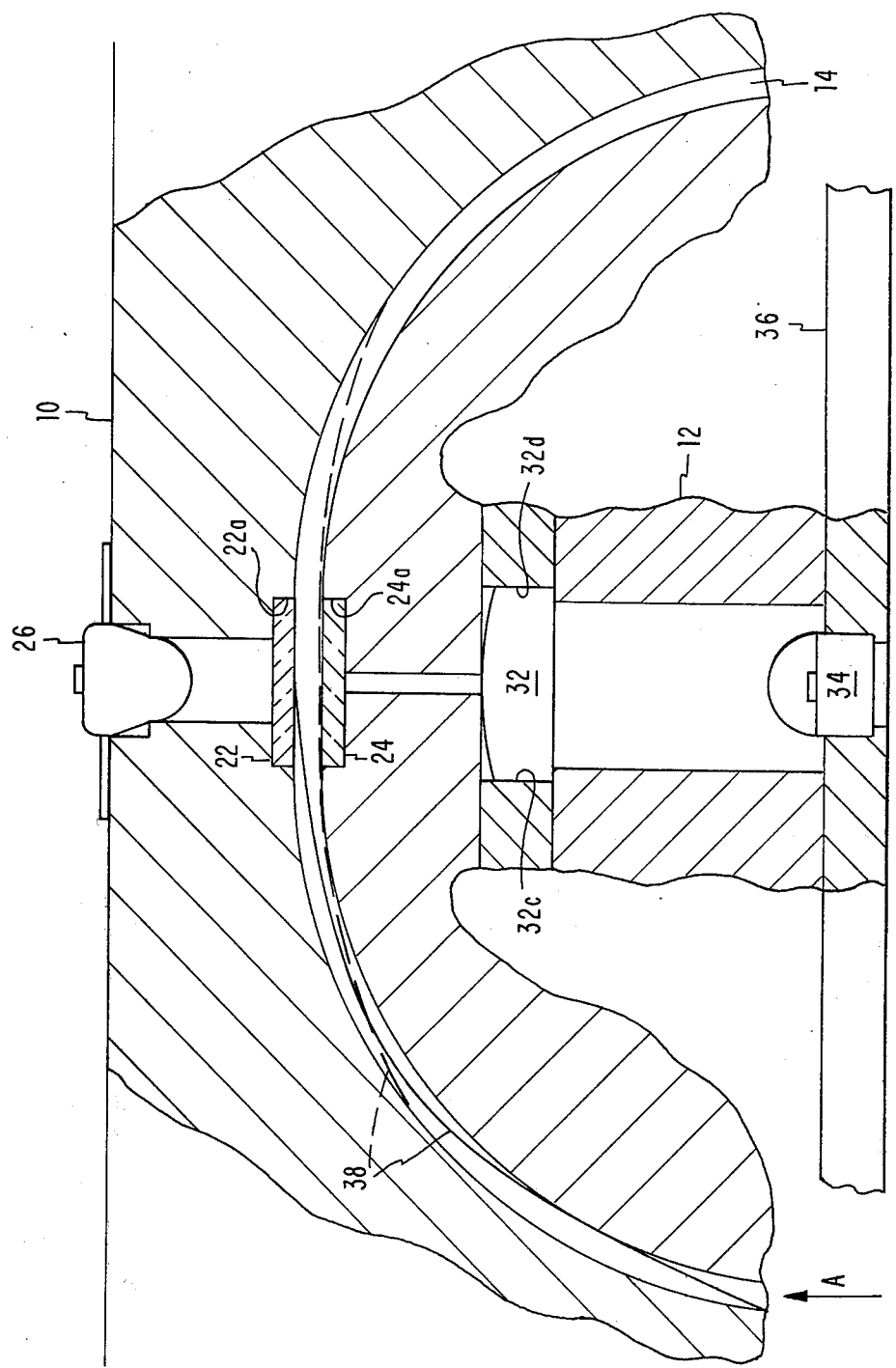
FIG. 2 is a longitudinal sectional view of the card reader and taken on line 2—2 of FIG. 1.

Referring now to FIGS. 1 and 2, the illustrated document card reader may be seen to comprise a light source holder 10 and a lens aperture member or unit 12 which is positioned oppositely with respect to the holder 10. The holder 10 and unit 12 from a semicircular document card transport slot 14 between them and are provided respectively with elongate column-like cavities 16a–16c and 18a–18c therein. Corresponding ones of these cavities extend along the same center lines, the center line 20b for the centrally located cavities 16b and 18b as seen in FIG. 1 and center lines 20a and 20c for the side cavities 16a and 18a and side cavities 16c and 18c. Dust covers 22 and 24 of transparent plastic material are disposed in slots 22a and 24a formed in the holder 10 and unit 12 respectively and close the adjacent ends of the cavities 16 and 18.

Light sources 26, 28 and 30, which may be light-emitting diodes, are disposed in a row in the outer ends of the three sets of cavities illustrated in FIG. 1, and they are positioned on and transmit light in the direction of the center lines 20a, 20b and 20c. A spherical convex lens 32 is disposed at the inner ends of the three cavities 18a–18c, and a photodetector 34 is disposed below the lens 32 and is held in place within a photodetector holder 36. The photodetector 34 has a relatively small diameter active area 34a, and the center of the lens 32 and the center of the photodetector active area 34a are on the center line 20b. The lens 32 is truncated on parallel edges 32a and 32b (see FIG. 1) and on parallel edges 32c and 32d (see FIG. 2) and is shown as being a plano-convex lens but could just as well be a double convex lens or other light converging lens.

Figure 3:
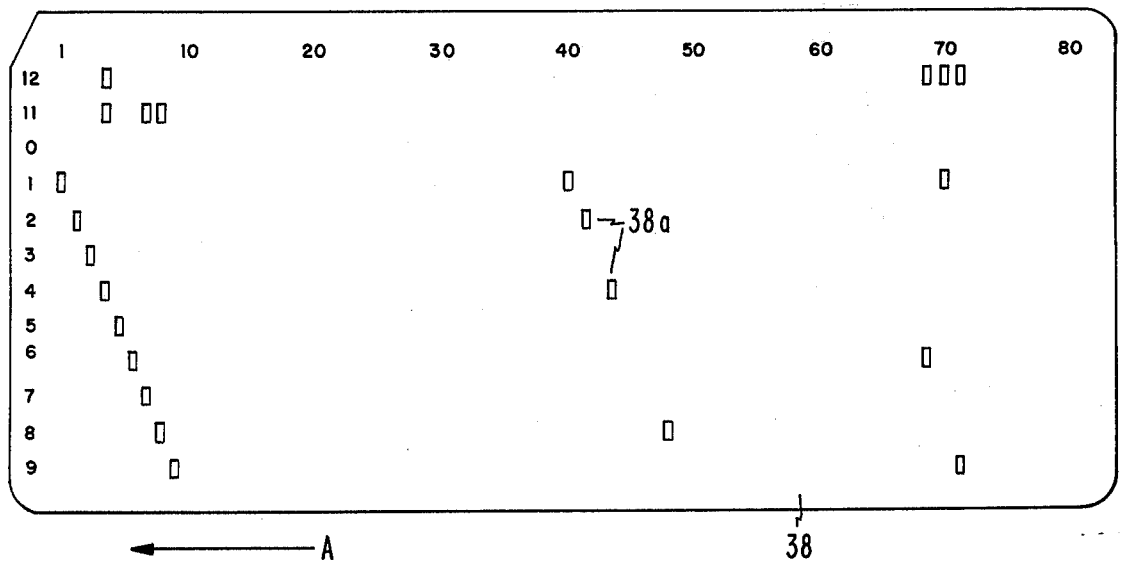
FIG. 3 is a plan view of a document card that may be used with the card reader of the invention.

Although the reader may be designed for usage with document cards of many different sizes, it is illustrated particularly with reference to the standard IBM 80-column document card 38 shown in FIG. 3. This card is approximately 3½ inches wide and 7⅜ inches long. The card has 80 columns extending transversely of the card and 12 rows extending longitudinally of the card. Punched data representative openings 38a may be provided at intersections of the rows and columns, and the reader reads these punched openings 38a as the card moves in the longitudinal direction A through the reader. The document card 38 is punched in a standard manner. The punched openings 38a are rectangular and straight-sided, having lengths of ⅛ inch, with the long dimensions of the openings 38a extending transversely of the cards. The rows (0, 1, 2, 3, 4, 5, 6, 7, 8, 9, 11 and 12) extending longitudinally of the card 38 are spaced ¼ inch apart on their centers, and the spacing between adjacent ends of openings 38a in adjacent rows and in the same column is thus ⅛ inch, the same as the lengths of the punched openings 38a. The lines 20a, 20b and 20c have the same spacing as the rows of openings 38a, namely, ¼ inch.

A document card 38 is read by the reader as the card 38 is moved in the direction A from one end of the slot 14 to the other end of the slot 14 as illustrated in FIG. 2. The card 38 may be so propelled by any suitable means (not shown). As the card 38 moves through the slot 14, its forward and trailing ends scrape across the inner surface of the dust cover 22, and the dust cover is thus kept clean. The dust cover 22, although being of light transmitting plastic, is sufficiently hard so that this scraping action does not scratch the dust cover. The card 38 is shown in its full line position in FIG. 2 as its forward end just begins to move across the inner surface of the dust cover 22 in this cleaning action. The radius of the semicircular slot 14 is sufficiently short with respect to the length of the card 38 so that the card is flexed out of flat form and is at this time in its curved full line form as shown in FIG. 2.

As the card 38 moves in direction A within slot 14, its center portion scrapes across the inner surface of the dust cover 24, and the center portion of the card thus maintains the inner surface of the dust cover 24 clean. The radius of curvature of the semicircular slot 14 is sufficiently short so that this occurs and so that the card 38 is curved and flexed as it has this cleaning action with respect to the dust cover 24, as is shown in the dotted line position of the card 38 in FIG. 2.

The center lines $20a$–$20c$ of the light sources 26, 28 and 30 are in alignment with three of the longitudinal rows of openings $38a$ as the card 38 moves in the direction A through the slot 14. The light sources provide rays (such as the portions of rays $R_1$–$R_4$ within the cavities 16) that extend parallel with the center lines $20a$–$20c$. Therefore, when each of the openings $38a$ aligns with one of the center lines, light is transmitted from the corresponding light source 26, 28 or 30, through the corresponding cavity 16 and to the corresponding cavity 18. If an opening $38a$ is in alignment with center line $20b$, the light proceeds directly from the light source 28 to the photodetector active area $34a$. If the opening $38a$ is in alignment with the center line $20a$ or $20c$ of one of the other two light sources 26 or 30, the light proceeds through the convex lens 32 and is bent and refracted by the lens so that this light also impinges on the photodetector active area $34a$. Two such rays $R_1$ and $R_2$ are shown from the light source 26, and it will be observed that these two rays $R_1$ and $R_2$ are bent by the lens 32 and impinge on the photodetector active area $34a$.

As the card 38 moves in the direction A through the slot 14 and as the openings $38a$ in three of the rows move in alignment with the center lines $20a$–$20c$ through the light sources 26, 28 and 30, light passes through the openings to the photodetector active area $34a$; and the openings $38a$ in three adjacent rows are thus read. This light transmission may be directly from the light source 28 or indirectly from light sources 26 and 30 (with beam curvature by the spherical lens 32) to the photodector active area $34a$. The light sources 26, 28 and 30 are lighted in sequence for very short periods of time in order that a light beam striking the photodetector active area $34a$ represents an opening $38a$ in only one of the three rows of openings being read, so that openings in any of the three rows may be detected separately from each other.

Although only three light sources 26, 28 and 30 are shown in FIG. 1 for reading the openings $38a$ in three of the 12 longitudinal rows of the document card 38, it will be understood that additional assemblies as shown in FIG. 1 may be used for reading the openings $38a$ in the other rows of openings in the card 38. For the 12 rows of openings $38a$ illustrated in FIG. 3, an additional three of the FIG. 1 assemblies including an additional nine light sources similar to the light sources 26,, 28 and 30 would be utilized. The additional light sources would be in the same row as the illustrated light sources 26, 28 and 30. It will be apparent that as many of the FIG. 1 assemblies will be needed as is equal to the total number of longitudinal rows of openings divided by 3, since the FIG. 1 assembly includes the three light sources 26, 28 and 30.

Due to the fact that the convex lens 32 is used beneath the cavities 18 and due to the fact that the photodetector active area $34a$ is quite small in diameter, any rays of light (which would be relatively weak) transmitted through a document card 38 do not impinge on the photodectector active area. This is due to the characteristic of the card 38 and the material from which it is made (heavy paper) to scatter light more than absorbing light. Due to this scattering effect, the rays $R_3$ and $R_4$ from light source 28 (see FIG. 1) transmitted (with decreased intensity) through card 38 do not travel parallel with the center line $20b$. Convex lens 32 increases the deflection of these rays from their original directions in leaving the card 38 to the side and out of parallel relationship with respect to the center line $20b$, and the rays $R_3$ and $R_4$ thus miss the photodetector active area $34a$. The results is a high signal to noise ratio at the photodetector active area $34a$ for a card versus no card condition in slot 14. The same scattering of rays would take place by a document card 38 positioned in alignment with the light sources 26 and 30.

The walls $18w$ and $18x$ of each of the cavities 18 form optical stops for cross talk light rays such as ray $R_5$. Ray $R_5$ impinging on the wall $18x$ of cavity $18c$ in alignment with light source 30 comes from the cavity $16b$ in alignment with adjacent light source 28. The ray $R_5$ is defined by the corner or aperture edge $16y$ for the cavity $16b$ and is also defined by the corner or aperture edge $18y$ of the cavity $18c$. It will be apparent that the main reason that ray $R_5$ is stopped by the walls of the cavty $18c$ is because the cavity $18c$ is made sufficiently long so tht the ray $R_5$ does not reach the lower end of the cavity $18c$.

A ray $R_6$ of ambient light also is stopped by a wall $18w$ or $18x$ of the cavity $18c$ aligned with light source 30. This is assumed to be from light surrounding the FIG. 1 assembly rather than from light due to adjacent light sources. Ambient light rays are stopped in the same manner by the walls of the other cavities $18a$ and $18b$. The relatively long length of the cavities 18 also is the main reason that most ambient light is blocked with respect to the photodetector 34.

The photodetector 34 is positioned by the holder 36 so that the photodetector active area $34a$ is approximately at the predetermined focal point of the lens 32. The lens 32 thus maximizes the light rays reaching the photodetector active area $34a$ through an opening $38a$ of the card 38 and maximizes the ray scattering properties of the assembly in scattering rays, such as $R_3$ and $R_4$, that are not transmitted parallel with the center lines of the light sources 26, 28 and 30 and the cavities 16 and 18.

Advantageously, the focusing effect of the convex lens 32 provides a means of efficiently gathering light from document card openings $38a$ in a plurality of adjacent ones of the longitudinal rows of openings $38a$, with individual openings $38a$ being read due to the multiplexing action of the light sources 26, 28 and 30 pulsed consecutively. The focusing effect of the convex lens 32 also assists in scattering light transmitted through the cavities 18 other than in a direction parallel with the center lines $20a$–$20c$ of the cavities to provide a higher signal to noise ratio for a card versus no card condition in slot 14. The convex lens 32 also assists in providing good off-punched hole readability, since even if the punchings $38a$ are slightly off register with respect to their proper positions, the lens 32 will tend to focus the light transmitted through these openings $38a$ to the photodetector active area $34a$. *The relatively long lengths of the cavities 18 substantially eliminate cross talk and ambient light problems and help* to ensure uniform illumination of the photodetector active area 34a by light transmitted through card openings 38a. Due to the relatively short radius of the card slot 14 considered with respect to the length of the card 38, the card 38 polishes the light transmitting inner surfaces of the dust covers 22 and 24 and maintains them dust free.

We claim:

1. A reader for a document card having data representative openings therethrough disposed in a plurality of columns, said reader comprising:
    a plurality of light sources disposed in a row and producing parallel output light rays,
    means providing a path of travel for the document card so that it may cut said light rays and so that its said openings in one of its said columns respectively line up with the light rays from said light sources to allow the light rays to pass therethrough,
    a light detector positioned directly in line with the light ray from a middle one of said light sources but being of such restricted size that it is not in line with the light rays from the other ones of said light sources, and
    a convex lens positioned to have the light rays from said light sources impinge on a convex surface of the lens so that the lens converges the light rays from said light sources to cause all of the light rays to impinge on said light detector.

2. A document card reader as set forth in claim 1, said light detector being located approximately at the focal point of said lens.

3. A document card reader as set forth in claim 2 and including a light source holder having column-like cavities for transmitting the output rays from said light sources and a member spaced with respect to said light source holder to provide said card path of travel between said member and said light source holder, said member having a column-like cavity in substantial alignment with each of said cavities in said light source holder and transmitting light from the corresponding light source to said convex lens.

4. A document card holder as set forth in claim 3, each of said column-like cavities in said member being of such substantial length that a ray of light from the column-like cavity in said light source holder for an adjacent light source impinges on the side wall of this cavity in said member and does not pass through this cavity in said member.

5. A reader for a document card having data representative openings therethrough, said reader comprising:
    a light source producing an output light ray,
    a first member having a light transmitting opening therethrough and positioned so that said light transmitting opening receives said output light ray and having a curved surface in light communication with said opening,
    a second member having a curved surface substantially corresponding in curvature with said first-named curved surface and spaced adjacent to and oppositely from said first-named curved surface so that said curved surfaces of said two members define a curved path of travel for the document card, said second member having a light transmitting opening therethrough which is in communication with said curved path of card travel between said two members and is in communication with said light transmitting opening in said first member,
    a light detector positioned at the end of said light transmitting opening in said second member so as to receive said light ray passing through said two light transmitting openings and across said curved path of card travel, and
    a dust cover located in one of said curved surfaces and carried by the corresponding one of said members and being of light transmitting material to allow the light ray to pass through if from said light source to said light detector,
    said curved surfaces and path having radii sufficiently small with respect to the length of said document card so that said document card is bent and wipes across the surface of said dust cover to maintain the dust cover clean as the card travels along said path.

6. A document card reader as set forth in claim 5 and including a second dust cover of light transmitting material located in the other one of said curved surfaces and being in alignment with the said light transmitting opening in the corresponding one of said members and also allowing the light ray to pass through it to said light detector,
    said path of card travel having a sufficiently small radius with respect to the length of said document card so that said document card being bent as it travel along said path wipes across the surface of said second dust cover as well as said first dust cover.

* * * * *